Nov. 13, 1945.     C. W. SKINNER     2,388,875
MEANS FOR MEASURING AND MARKING CORD LENGTHS
Filed Nov. 3, 1943     3 Sheets-Sheet 1
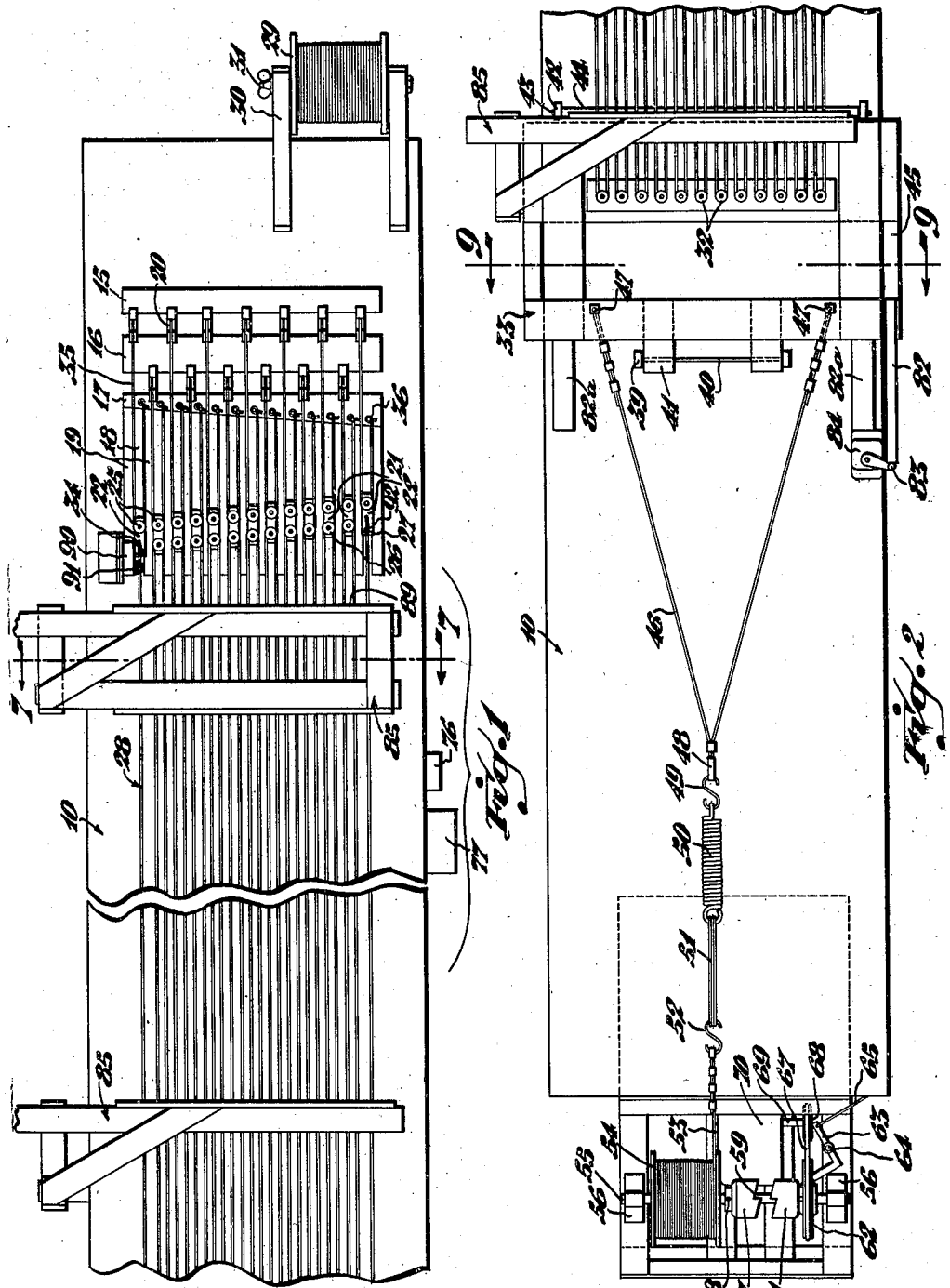
INVENTOR.
Charles W. Skinner
BY Wood, Arey, Kerran & Evans
Attorneys.

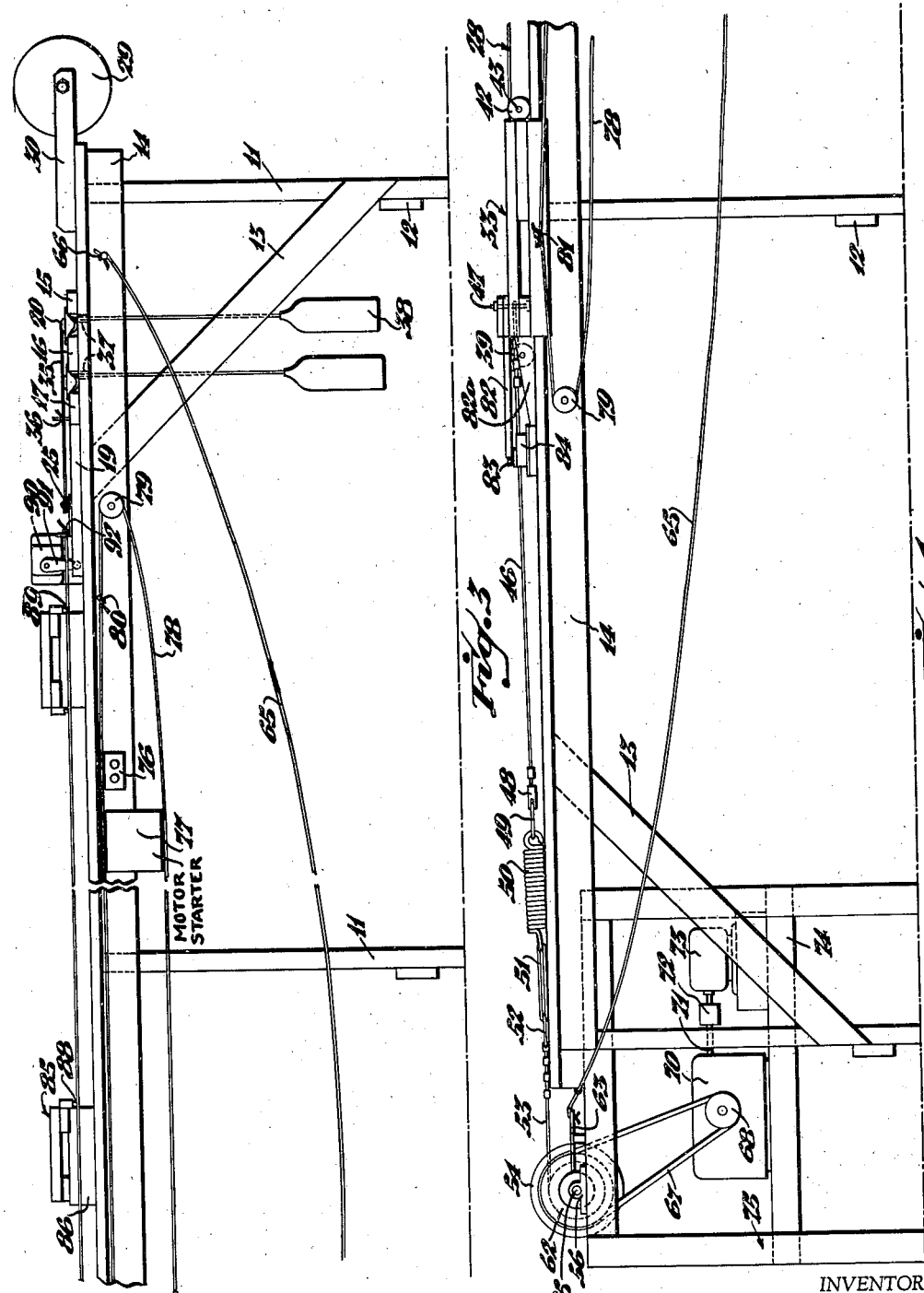

Nov. 13, 1945.  C. W. SKINNER  2,388,875
MEANS FOR MEASURING AND MARKING CORD LENGTHS
Filed Nov. 3, 1943  3 Sheets-Sheet 3
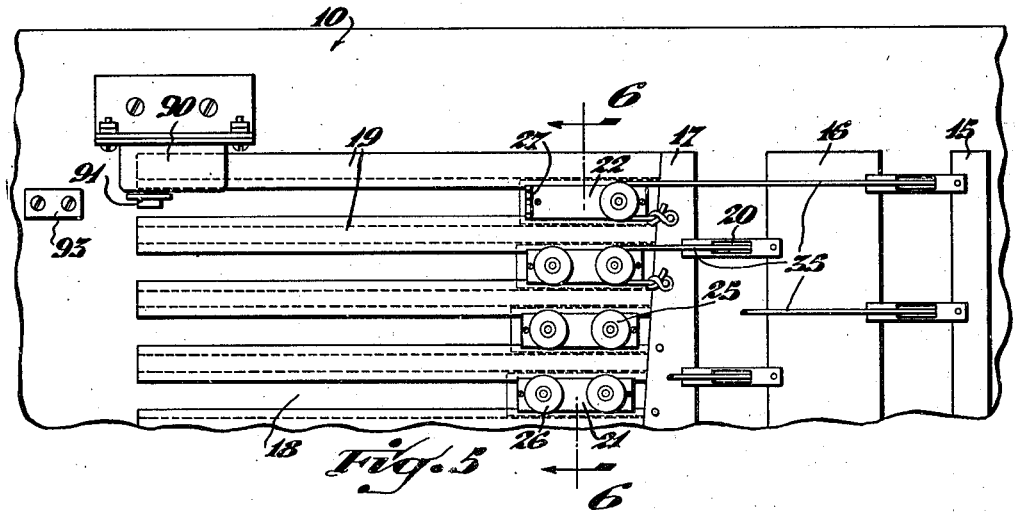
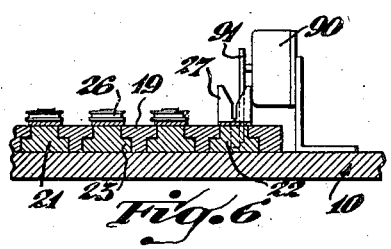
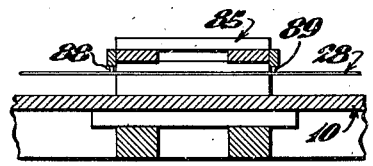
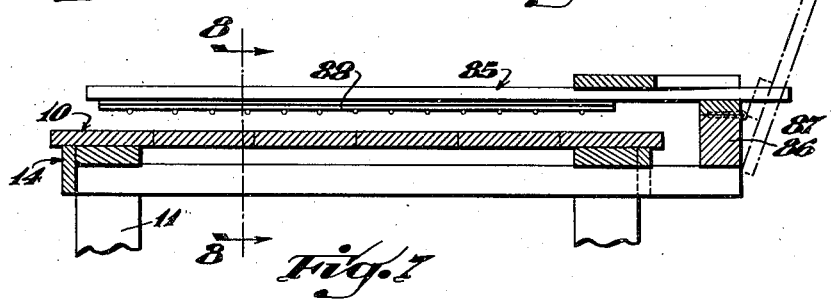
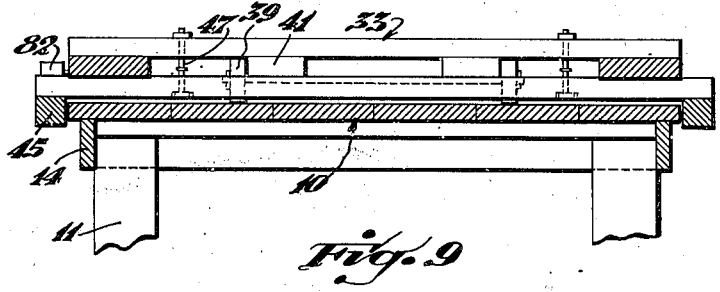
INVENTOR.
Charles W. Skinner
BY Wood, Trey, Herron & Evans
Attorneys Patented Nov. 13, 1945

2,388,875

UNITED STATES PATENT OFFICE 2,388,875

MEANS FOR MEASURING AND MARKING CORD LENGTHS

Charles W. Skinner, Cincinnati, Ohio, assignor to Fashion Frocks, Inc., Cincinnati, Ohio, a corporation of Ohio Application November 3, 1943, Serial No. 508,841

6 Claims. (Cl. 33—125)

This invention is concerned with a device for producing rapidly and in large quantities cord sections which are all of exactly the same length. The invention has particular application to the quantity production of certain types of articles in which such cord lengths are utilized. A specific example of an article in which the invention has great utility is a parachute. Each parachute includes as component elements thereof a number of shroud lines and, for the parachute to function effectively, it is absolutely essential that these lines be all of exactly the same length. Although there may be various other uses to which the invention is equally well adapted, in the ensuing specification the production of these parachute shroud lines will be considered as representing the preferred utility.

In all devices which are adapted to measure by mechanical means and, possibly to mark and sever cord sections of equal length, the principal problem has been to avoid a stretching of the cord or to equalize this stretching over the entire cord length. Particularly where the cord is cut in substantial lengths such as several feet or more, it is quite possible to establish an appearance of equal length between a number of different cords arranged in the device under some form of tension; whereas, actually, in an untensioned state the cords are not truly of the same length because certain of them have been tensioned to an unequal degree. After the cord lengths have been severed and the tension has been relaxed, this inequality of tensioning may result in a series of cords which, although apparently of equal length when arranged in the measuring device, actually may differ as much as several inches in a length of several feet.

In the mass production of parachutes, inequalities in the length of the shroud lines present a rather serious problem, as the inequality is inevitably carried into the finished parachute and may seriously affect its control and operation. The accurate control of the parachute may be a highly important matter, particularly under war conditions where it is desired to land a body of parachute-equipped troops in and around some comparatively confined area such as, for example, an airfield.

There have been, in the past, various types of reeling devices for accomplishing the general purpose of the present invention and it is recognized that certain elements of the prior art construction have been included herein. For this reason, the specific features of novelty will be clearly pointed out in the course of the description of the preferred embodiment of the invention.

One of the objects of the present invention has been to provide a reeling device for measuring cord lengths in which the cord utilized is stretched to a minimum degree during the operation of the device.

Another object has been to provide a device in which such stretching of cord lengths as occurs is compensated for so as to produce cord length units which, after relaxation of the tension imparted by the device, are of exactly equal length.

Another object has been to provide a device for equalizing a plurality of cord lengths and for marking the lengths at predetermined points in a substantially simultaneous operation.

Another object has been the provision of a cord equalization device which is of simple construction and can be readily manipulated by a single and comparatively inexperienced operator.

Another object has been the provision of a device of the character described which although adapted to hand operation is likewise adapted to be power-driven during the stage of operation in which a substantial amount of impetus is required, and manually operated at other stages.

Other and further objects and advantages will be apparent from the further and more detailed description of the invention when considered in conjunction with the drawings, in which:

Figures 1 and 2, taken together, are a top plan view of a preferred embodiment of the device of the invention, positioned on a work table. Figure 1, from which a portion has been broken out, is the right-hand end of the device, and Figure 2 is the left-hand end. In these views the cord lengths are in extended and measured condition.

Figures 3 and 4 are similar side elevations of the table, Figure 3 again being the right-hand end and Figure 4, the left-hand end.

Figure 5 is a greatly enlarged top plan view of an upper right-hand portion of Figure 1, particularly illustrating the arrangement of various of the pulleys and travelers at the commencement of the measuring and marking operation.

Figure 6 is a sectional view along the line 6—6, Figure 5.

Figure 7 is a sectional view along the line 7—7, Figure 1.

Figure 8 is a sectional view along the line 8—8, Figure 7.

Figure 9 is a sectional view along the line 9—9, Figure 2.

The general plan and arrangement of the device is clearly shown in Figures 1-4. 10 is a table of relatively conventional construction, on which the working elements of the device have been assembled. This table may have a number of vertical legs 11 arranged generally at the corners thereof, cross supports 12 joining the legs, and diagonal struts 13 secured to the legs and to the side rails 14 which are positioned directly under, and support, the table top. Secured directly to the top of the table toward the right-hand end thereof are three cleats, numbered 15, 16 and 17, respectively. The cleat 17 may be of an irregular rectangular configuration having an edge which tapers diagonally to the left. The purpose of this particular configuration will be noted subsequently. Traveler tracks 18, having grooved side surfaces formed by the T-shaped longitudinally extending strips 19, extend to the left of the cleat 17 for a distance comparatively as indicated in Figure 1. A plurality of pulleys 20 are disposed between the cleats 15 and 16, and the cleats 16 and 17. This staggered arrangement of the pulleys 20 is in the interest of the conservation of space, and, insofar as the mechanical operation of the device is concerned, it would be possible to arrange them in a single line.

Travelers 21 are disposed one in each of the traveler tracks 18. With the exception of the uppermost and lowermost travelers, which have been designated as 22, these travelers are of identical construction. As shown in Figure 6, the lower side surfaces of each is configurated to form lateral tongues 23 which are adapted to engage in corresponding grooves in the T-shaped strips 19. It is preferable that this engagement be comparatively loose to permit the travelers to move fairly readily along the tracks. Each of the travelers 21 has a pair of sash pulleys journalled on vertical shafts and disposed on its upper surface. Although each of the pulleys on each traveler is of identical construction, their utility is somewhat different, so that the right-hand pulleys (Figure 1) on each traveler have been designated as 25, and the left-hand pulleys, 26. The two travelers 22 have right-hand pulleys only and, in lieu of a left-hand pulley, have slotted Y-shaped uprights 27, as shown in Figure 6, for the reception of the terminal knots in the line.

The cord length which, in the position shown in Figures 1 and 2, is in the process of being measured into a number of equal length sections, has been designated generally as 28 and, at the stage of the operation shown in Figures 1 and 2, is a continuous length of cord originating from the reel 29. This reel may be disposed between arms 30 secured to the table and supporting a shaft 31, on which the reel is rotatable. The continuous cord 28 extends around sash pulleys 32 positioned in a row on the movable carriage 33. In threading the cord 28 around the pulleys the cord is first passed through the slotted Y-shaped upright 27 on the uppermost traveler 22 with the knotted end 34 engaged behind the upright as shown in Figure 1. The cord then passes to the left and around the uppermost of the sash pulleys 32 on the carriage, back and around the pulley 26 of the uppermost traveler 21, and then backward and forward from the pulleys 32 to the pulleys 26 until the lowermost pulley 32 is reached. The cord is continuous from the lowermost pulley 32 to the reel 29, passing over the lowermost traveler 21. The cord is cut prior to a subsequent operation which will be described later in the specification.

A plurality of individual cords 35 are secured at one end each to the cleat 17, as at 36. Each of these cords extends around a right-hand pulley 25 on travelers 21 and 22 and is then brought back, passed over a pulley 20 and then downwardly through an appropriate bore 37 in the top of the table, where it is secured to a weight 38 which in the operation of the device functions as a drag on the movement of the travelers 21 and 22 as will be subsequently explained. The staggered arrangement of the pulleys 19 and 20 is primarily to keep the weights 38 from contacting one another under the table top.

The movement of the carriage 33 forward and back on the table top is accomplished through a pair of small rollers 39 journalled one on each end of a shaft 40 on the forward end of the carriage. The shaft 40 may be supported by projections 41 extending from the front of the carriage. A similar pair of rollers 42 are journalled on stub shafts 43 at the rear of the carriage. These shafts may be fixed in the ends of a rearwardly projecting strip 44 which is fixed to the carriage. To maintain the carriage in alignment on the table, guide rails 45 extending downwardly below the surface of the table top are provided on each side of the carriage.

The carriage is actuated forward or toward the left in the position shown in Figures 1 and 2, by a halter 46, secured to its front end at the points 47. A cable clip 48 is secured to the halter at a central point, and the loop formed by this clip, in turn, is successively joined to an S-shaped cable thimble 49, a spring 50, a series of strands of shroud line taped into a single unit 51, and a second cable thimble 52. Secured to the cable thimble 52 is a steel cable 53 which is wound on the reel 54. This reel is disposed on the shaft 55 journalled in the brackets 56. A clutch plate 57 is pinned to the shaft 55, as at 58. This clutch plate is of a conventional type and is rotatable with the reel. The edge may be configurated as indicated at 59 to engage with a similarly configurated clutch plate 61. This clutch plate 61 and pulley 62 are journalled on the shaft 55, but are not pinned to this shaft so that, upon disengagement of the clutch plates 57 and 61, the reel 54 will stop turning and the operation of the carriage will cease. An arm 63, pivoted at the point 64, actuates the pulley 62 and the clutch plate 61 toward the clutch element 57, and engages the correspondingly configurated surfaces 59 of the clutch plates. The arm 63 is actuated by the clutch cable 65 which is secured to an end thereof. The clutch cable is then extended the length of the table and pinned to a point on the side rail, as at 66. This clutch cable may be depressed and the clutch engaged by the foot of an operator standing at the side of the table.

A belt 67 extends around the pulley 62 and the smaller pulley 68 which is pinned on the shaft 69. This latter shaft enters a speed reducer 70. The shaft 71 extends from the speed reducer through a flexible coupling 72 to the motor 73 which provides the source of power for the operation of the reel 54. The motor and the speed reducer are positioned on a platform 74 forming a part of an extension of the table, designated generally at 75.

The operation of the motor 73 is initiated from the push button panel 76 which may be conveniently positioned on the side rail of the table, as shown in Figure 3. A motor starter 77 may be provided adjacent the push button panel for initiating the operation of the motor from the panel.

A continuous cord belt 78 may be disposed around pulleys 79, also journalled on the side rail of the table. A marking knot 80 is tied in this cord belt at some point along the length thereof, and the cable itself is secured to the carriage 33, as at 81. This belt and the relative positioning of the knot 80 performs a function in the gauging operation of the device which will be subsequently described in the description of the complete operation.

A stop means is provided by an arm 82 secured to the front end of the carriage 33 and by stop blocks 82a. Arm 82 is adapted to engage with an arm 83 extending from the limit switch 84 positioned on the upper surface of the table. The limit switch is so arranged in the general wiring system that its disconnection stops the operation of the motor 73. Stop blocks 82a provide a definite stop and spring 50 absorbs inertia of motor and mechanism after limit switch 84 cuts the current and the carriage reaches the stop blocks.

Arranged at various points along the table are cord markers 85. These markers, which are of a general gate-like construction, have one of their ends supported on the blocks 86 and are hingedly connected thereto, as at 87 (see Figure 7). A continuous ink die 88 extends across the lower surface of each marker. In the construction of parachute shroud lines, the three markers shown are intended to indicate the correct positioning of the connector ring, skirt, and vent, respectively, of the parachute, and they are disposed along the table in a predetermined positioning with respect to the ends of the cord lengths, so that the point of attachment of these particular parachute elements will be marked on the cord lengths with exactitude. When the markers are not performing their marking function, they may be swung upwardly and away from the table on the hinges 87. Obviously, the exact construction of the markers is subject to wide modification, so that the particular embodiment shown in the drawings has not been described in complete detail.

The point of severance of the cords is preferably along the line 89 at the right-hand edge of the skirt marker, although, depending on the length of the table and the arrangement of the elements, this point may be varied as desired. Each severed cord will be of a length equal to twice the distance between the line of severance and the pulleys 32.

A second limit switch 90 is positioned on an edge of the upper surface of the table adjacent the uppermost traveler 22. The arm of this switch 91 is operable upon engagement with the front edge of the traveler. This limit switch functions to disconnect the circuit when this traveler is moved forward on its track, due to a particular difficulty arising in the operation of the device such as, for example, the formation of a knot.

At the commencement of the operation the carriage is toward the right end of the table approximately adjacent the ends of the traveler tracks, and the cord is extended from the reel 29 and around the pulleys 26 and 32 in the manner previously described. At this point in the operation the weights 38 are resting on the floor and the weight cords 35 are relaxed. The travellers are at the far right end of their tracks closely adjacent the cleat 17 and approximately as shown in Figure 5. The operator then starts the motor and engages the clutch plates 57 and 61 by exerting pressure on the clutch cord 65. As the reel 54 winds up the cable 53, the carriage moves down the table to the left and, as it moves, the cord is unwound from the reel 29 and slips around the two rows of pulleys 26 and 32, the lengths of the various cord sections between the sets of pulleys 26 and 32 being equalized in a general sort of way during the course of this operation.

However, even though the pulleys are of the most frictionless type, a certain amount of tension builds up on the cord in a progressive way from the lowermost strand to the uppermost strand, considering the strands as they are shown in Figure 1. As a result, during the first stages of the movement of the carriage, the degree of tension on each individual cord strength is progressively greater from the bottom strand to the top. The reason for this is that the lowermost strand, which is coming directly out of the reel, is under no tension at all. The second lowermost strand has acquired the friction of one pulley, the third lowermost strand, of two pulleys, and so on until the uppermost strand has acquired all of the friction from the operation of an entire row of pulleys at each end of the device. This much of the operation has been included in the prior art practices and it does not produce a satisfactory result because, if the cord lengths were to be severed at the conclusion of this stage of the operation, the lengths which are under the greatest tension would, after the severance, be materially shorter than those under less tension, or no tension at all.

In order to overcome this difficulty, a second operation has been provided. When the carriage has moved to the left to a point where the forward end of the projection 82 is slightly a distance from the arm 83 of the limit switch 84, which distance is greater than the distance which the travelers 21 and 22 must move to the left before they lift the weights or drags 38 from the ground, the operation of the device is checked by stopping the motor. The cord extending from the reel 29 is then cut at a point closely adjacent the Y-shaped upright 27 on the lowermost traveler. A knot 92 is formed at the end of the cord and this knot is inserted in the slot in the Y-shaped upright. At this stage of the operation the weights are still on the floor and the travelers 21 are still at the right end of their tracks in the approximate position shown in Figure 5. Thereupon, the movement of the carriage is recommenced until the projection 82 hits the arm 83 of the limit switch and the stop blocks 82a. During this last stage of travel of the carriage the travelers 21 and 22 are pulled to the left edge of their tracks to the approximate position shown in Figure 1 and this movement of the travelers lifts each of the weights attached to the cords 35 from the floor until they hang free, as illustrated in Figure 3. The reason that the travelers move to the left on their tracks a greater distance progressively from bottom to top is because the cords are under greater tension in this same progression. However, when each of the weights has been lifted from the floor, there is an exactly equal amount of tension exerted on each cord in the opposite direction, i. e. from left to right.

The weights utilized are preferably substantial; for example, a twenty pound weight may be used for each of the travelers except the uppermost and lowermost which, since they control only a single cord, require only half as much, or, ten pounds. When the weight is substantial it will tension each individual cord to a considerably greater degree than any cord is affected by the pulley friction.

While the cords are in the position shown in Figure 1, they are marked by a lowering of the markers 85 until the ink dies 88 contact the individual cord lengths, as shown in Figure 7. After the lines are marked the motor is reversed until the tension in the lines ceases to pull the carriage back. Thereupon, the lines are removed from the table, then the clutch is released and the carriage pushed back to starting position. The lines are cut in any convenient manner after they are removed from the table.

During the first stage of the carriage movement it is desirable that a guide be provided to indicate to the operator when the movement should be stopped. This function is performed in the device described by the knot 80 on the continuous cord belt 78. The operator will be enabled to determine from experience just when this knot has arrived at a point on the continuous belt, when the first movement should be stopped and, by watching the knot, can stop the motor at the moment when the carriage has reached the approximately correct spot. Obviously, this same result can be attained through various other means and instrumentalities.

After a series of cords has been marked and removed from the device, the carriage and travelers are returned to their approximate starting positions by manual means, the cord is again threaded through the pulleys in the manner explained, and the operation continued.

Occasionally a knot or obstruction of some kind will form on the cord which will interfere with the ordinary operation of the device. When this occurs, the tension exerted on the uppermost cord 28 may become so great that the uppermost traveler will be pulled to the left on its track and its supporting weight raised from the floor. When this traveler reaches the limit switch 90 and contacts the arm 91 thereof, the operation is automatically terminated, so that the difficulty can be corrected. Since, in the ordinary operation of the device, the uppermost traveler will always be under the greatest tension and the movement of this traveler is controlled by the limit switch 90, there is no possibility that any of the travelers can be pulled completely from their tracks. However, stops for this purpose can be provided if desired and, in the preferred embodiment, one such stop for the uppermost traveler has been designated at 93 in Figure 5.

From the foregoing description it will be apparent that the invention supplies a definite want in this particular art, in that it provides means for overcoming the tension imparted to any particular cord in a mechanical device operating simultaneously on a number of cords.

Since it may be that similarly effective results can be realized through other devices which, though of different construction, operate on the broad principles which have herein been described, I desire that my invention be limited only by the ensuing claims.

Having described my invention, I claim:

1. In a device for measuring sections of equal length on a continuous cord, a movable carriage, a row of guides positioned on the carriage, a corresponding row of individually slidable travelers spaced from the carriage, a guide positioned on each traveler, said rows of guides being adapted to support a continuous cord length threaded between alternate guides on carriage and travelers, said carriage being movable away from the travelers, and means for applying equal resistance to each traveler to movement toward the carriage during the course of the carriage movement to equalize the tension on the cord sections supported between the guides.

2. A device for equalizing the tension on a plurality of cord lengths supported between spaced rows of guides, comprising a table, a carriage movable on the table and supporting a row of guides, a row of travelers spaced from the carriage, said travelers being also movable on the table, each of said travelers supporting an individual guide, a continuous cord length threaded between the row of guides on the carriage and the row of guides on the travelers, said carriage being movable away from the travelers to lengthen the cord sections disposed between the rows, and drag means associated with each traveler for tensioning each cord section individually and equalizing the tension imparted to the cord sections during the movement of the carriage.

3. In a device for measuring off equal length sections on a continuous cord and marking the sections to define a plurality of equal length cords, a base, a row of guides, means supporting the guides in said row spaced apart and in lateral alignment, said means being mounted on said base for movement of said guides as a unit, a second row of guides spaced from the first row, means mounted on said base and supporting the guides of said second row individually for movement relative to the base and to each other, said first named row being movable away from the second row to lengthen the cord sections disposed between the rows, means for equalizing the tension imparted to the cord sections during movement of said first named row, and means for marking all of the cord sections simultaneously after the tension has been equalized to define severance points for providing cords of equal lengths.

4. In a device for defining a plurality of equal length sections on a continuous cord, a base, a row of guides, means supporting the guides of said row spaced apart, said means being mounted on said base for movement of said guides as a unit, a second row of guides spaced from the first named row, said rows being adapted to support a continuous cord threaded therebetween, means mounted on said base and supporting the guides of said second row individually for movement relative to the base and to each other, means for moving said first named row away from the second to lengthen the cord sections disposed between the rows, and drag means associated with the individually movable guides for tensioning individually the cord section disposed between each corresponding pair of guides to equalize the tension imparted to the cord sections during the movement of the first named row.

5. In a device for measuring equal length sections on a continuous cord, a base, a pair of rows of guides, said rows being spaced apart and adapted to support a continuous cord threaded therebetween, means supporting one of said rows of guides for movement as a unit relative to said base, means supporting the guides in the other said row for movement relative to said base and to each other, said first named row being movable away from the second to lengthen the cord sections disposed between the rows, and means individual to the respective cord sections for applying tension thereto which is uniform from cord section to cord section.

6. In a device for measuring off equal length sections on a continuous cord, a base, a row of guides, means supporting the guides in said row spaced apart and in lateral alignment, said means being mounted on said base for movement of said guides as a unit, a second row of guides spaced from the first row, means mounted on said base and supporting the guides of said second row individually for movement relative to the base and to each other, said first named row being movable away from the second row to lengthen the cord sections disposed between the rows, and means for equalizing the tension imparted to the cord sections during movement of said first named row.

CHARLES W. SKINNER.